(12) United States Patent
Apdalhaliem et al.

(10) Patent No.: US 10,876,922 B2
(45) Date of Patent: Dec. 29, 2020

(54) METHODS AND SYSTEMS FOR DETERMINING OPTICAL PROPERTIES FOR LIGHT TRANSMITTED MEDIUMS

(71) Applicant: THE BOEING COMPANY, Chicago, IL (US)

(72) Inventors: Sahrudine Apdalhaliem, Seattle, WA (US); Kimberly D. Meredith, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 542 days.

(21) Appl. No.: 14/301,686

(22) Filed: Jun. 11, 2014

(65) Prior Publication Data

US 2015/0362402 A1  Dec. 17, 2015

(51) Int. Cl.
*G01J 3/42* (2006.01)
*G01M 11/02* (2006.01)
(Continued)

(52) U.S. Cl.
CPC .......... *G01M 11/0228* (2013.01); *G01J 3/28* (2013.01); *G01J 3/42* (2013.01); *G01M 11/005* (2013.01);
(Continued)

(58) Field of Classification Search
CPC ............ G01M 11/0228; G01M 11/005; G01B 11/0625; G01J 3/42; G01N 21/8422; G01N 21/59
See application file for complete search history.

(56) References Cited

U.S. PATENT DOCUMENTS

| | | | |
|---|---|---|---|
| 4,707,611 A * | 11/1987 | Southwell .......... | G01B 11/0633 250/559.28 |
| 5,999,267 A * | 12/1999 | Zawaideh .......... | G01B 11/0625 356/503 |

(Continued)

OTHER PUBLICATIONS

L. Mitsas "Generalized matrix method for analysis of coherent and incoherent reflectance and transmittance of multilayer structures with rough surfaces, interfaces, and finite substrates", Apr. 1, 1995.*

(Continued)

*Primary Examiner* — Maurice C Smith
(74) *Attorney, Agent, or Firm* — The Small Patent Law Group LLC; Joseph M. Butscher

(57) ABSTRACT

Methods and systems for determining optical properties for light transmitted mediums are provided. One method includes acquiring one or more measured values indicative of a reflectance for a material, acquiring one or more measured values indicative of a transmittance for the material, and determining a set of calculated values for an index of refraction coefficient and an extinction coefficient from the one or more measured values indicative of reflectance and transmittance, respectively. The method includes identifying a calculated value from the set of calculated values for the index of refraction coefficient and a calculated value from the set of calculated values for the extinction coefficient that are within a threshold determined by the difference between the one or more measured values indicative of the reflectance or transmittance and a predicted reflectance or transmittance, respectively. The method includes determining a reflectance and transmittance for the material using the calculated values.

20 Claims, 8 Drawing Sheets

(51) Int. Cl.
*G01M 11/00* (2006.01)
*G01N 21/59* (2006.01)
*G01J 3/28* (2006.01)
*G01N 21/55* (2014.01)
*G01B 11/06* (2006.01)

(52) U.S. Cl.
CPC ............. *G01N 21/55* (2013.01); *G01N 21/59* (2013.01); *G01B 11/0625* (2013.01)

(56) References Cited

U.S. PATENT DOCUMENTS

| | | | | |
|---|---|---|---|---|
| 7,465,590 B1* | 12/2008 | Feng | .................. | G01B 11/0625 257/E21.521 |
| 7,652,760 B1* | 1/2010 | Simpson | ............ | G01N 21/8422 356/237.1 |
| 2003/0200042 A1* | 10/2003 | Gan | ....................... | B25J 9/1692 702/105 |
| 2006/0167651 A1* | 7/2006 | Zangooie | ........... | G01B 11/0625 702/179 |
| 2009/0063076 A1* | 3/2009 | Liu | .................... | G01B 11/0625 702/82 |
| 2010/0141948 A1* | 6/2010 | Cohen | ................ | G01B 11/0625 356/369 |

OTHER PUBLICATIONS

Robert Siegel, "Net Radiation Method for Enclosure Systems Involving Partially Transparent Walls," National Aeronautics and Space Administration, NASA TN D-7384, Aug. 1973.

\* cited by examiner

METHODS AND SYSTEMS FOR DETERMINING OPTICAL PROPERTIES FOR LIGHT TRANSMITTED MEDIUMS

BACKGROUND

The present disclosure relates in general to light transmitted mediums, and more particularly to methods and systems to determine the optical properties of components and systems in light transmitted mediums.

In the airline industry, testing the optical properties of different aircraft window configurations typically includes the measurement of the optical properties for each of the different panes of the aircraft window. The optical properties, in particular the reflected and transmitted (spectra) characteristics, are key variables in determining window performance and in determining which system configuration meets specified optical, thermal, and mechanical design conditions. The reflectance and transmittance are highly dependent on the transmitted medium and greatly influence the system end performance. For example, the spectra characteristics of light impinging an air to glass interface is quite different from the spectra characteristics of light impinging from water into glass, such that the amount of light and heat reaching the next interface and ultimately the final destination surface of the system can vary significantly based on these parameters.

Because of the spectral dependency, conducting window or other light transmission system performance and trade studies across various architectures is difficult and costly to conduct, which oftentimes necessitates extensive and costly testing across various window specific architectures and designs because each of the panes must be individually tested. Conventional build and test hardware typically results in additional high costs, requires extensive lead and test time, and often requires test iterations to determine the optical qualities, how these qualities change across the different designs, and the final performance of each configuration.

Furthermore, the optical quality and hence effective properties of components and systems in light transmitted mediums can be adversely affected during manufacturing, transportation, and in service across different environmental conditions. Any defect, contamination, or change across environment will affect the effective system spectral properties, oftentimes resulting in undesirable system performance. As a result of the multiple tests that are conventionally performed, design cycle times are increased, as well as design and manufacturing costs. Additionally, conventional methods do not readily enable quality inspection and non-destructive test techniques that can be used on the receiving dock for inspection of components, during and post system assembly of the system on the manufacturing floor, and at others time as needed when the system enters into service.

SUMMARY

In one embodiment, a method for determining optical properties is provided. The method includes acquiring one or more measured values indicative of a reflectance for a material, acquiring one or more measured values indicative of a transmittance for the material, and determining a set of calculated values for an index of refraction coefficient and an extinction coefficient from the one or more measured values indicative of reflectance and transmittance, respectively. The method also includes identifying a calculated value from the set of calculated values for the index of refraction coefficient and a calculated value from the set of calculated values for the extinction coefficient that are within a threshold determined by the difference between the one or more measured values indicative of the reflectance or transmittance and a predicted reflectance or transmittance, respectively. The method further includes determining a reflectance and transmittance for the material using the calculated values identified within the threshold.

In another embodiment, a system for determining optical properties is provided that includes a spectrophotometer configured to provide one or more measured values indicative of a reflectance and transmittance of a material and a storage subsystem configured to store the one or more measured values. The system also includes a processor operably coupled to the spectrophotometer. The processor includes software modules having instructions therein which when executed by the processor are configured to obtain the one or more measured values indicative of the reflectance and transmittance. The processor is configured to determine a set of calculated values for an index of refraction coefficient and an extinction coefficient from the measured values indicative of reflectance and transmittance, respectively. The processor is also configured to identify a calculated value from the set of calculated values for the index of refraction coefficient and a calculated value from the set of calculated values for the extinction coefficient that are within a threshold determined by the difference between the one or more measured values indicative of the reflectance or transmittance and a predicted reflectance or transmittance, respectively. The processor is further configured to determine a reflectance and transmittance for the material using the calculated values identified within the threshold.

In another embodiment, a tangible and non-transitory computer readable medium is provided that includes one or more computer software modules having instructions therein configured to direct one or more processors to acquire one or more measured values indicative of a reflectance for a material, acquire one or more measured values indicative of a transmittance for the material, and determine a set of calculated values for an index of refraction coefficient and an extinction coefficient from the measured values indicative of reflectance and transmittance, respectively. The one or more computer software modules have instructions therein configured to further direct one or more processors to identify a calculated value from the set of calculated values for the index of refraction coefficient and a calculated value from the set of calculated values for the extinction coefficient that are within a threshold determined by the difference between the one or more measured values indicative of the reflectance or transmittance and a predicted reflectance or transmittance, respectively. The one or more computer software modules have instructions therein configured to additionally direct one or more processors to determine a reflectance and transmittance for the material using the calculated values identified within the threshold.

DETAILED DESCRIPTION

Figure 1:
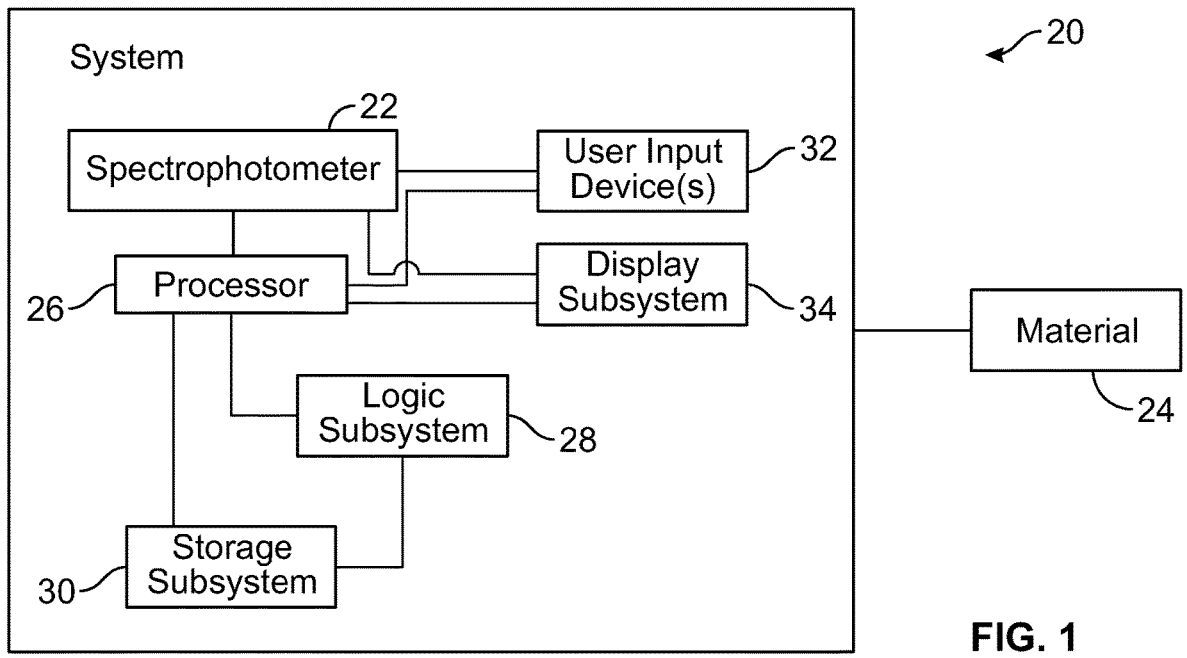
FIG. 1 is a block diagram of a system for determining optical properties in accordance with an embodiment.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry, between software elements or between hardware and software implementations. Thus, for example, one or more of the functional blocks may be implemented in a single piece of hardware or multiple pieces of hardware. Similarly, the software programs may be stand-alone programs, may be incorporated as subroutines in an operating system, and the like. It should be understood that the various embodiments are not limited to the arrangements and instrumentality shown in the drawings.

As used herein, the terms "system," "unit," or "module" may include any combination of hardware and/or software system that operates to perform one or more functions. For example, a system, unit, or module may include a computer processor, controller, or other logic-based device that performs operations based on instructions stored on a tangible and non-transitory computer readable storage medium, such as a computer memory. Alternatively, a system, unit, or module may include a hard-wired device that performs operations based on hard-wired logic of the device. The systems, modules, or units shown in the attached figures may represent the hardware that operates based on software or hardwired instructions, the software that directs hardware to perform the operations, or a combination thereof.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide systems and methods for determining optical properties in light transmitted mediums. Systems and methods described herein allow for determining the optical properties for components and systems in light transmitted mediums. Some embodiments provide for optical property testing for a light transmitted medium, such as in different aircraft window configurations including electronic dimmable window systems. However, one or more embodiments may be implemented or used to test any system in a light transmission medium in different industries and for different applications. Accordingly, while various embodiments are described herein for determining the optical properties of a particular type of aircraft window, one or more embodiments may be used to determine the optical properties of different types of aircraft windows, non-aircraft windows, as well as in other light transmitted mediums. In general, various embodiments can be used to determine the optical properties in any type of light transmitted medium, including for any type of application.

One or more embodiments include test equipment and use empirical methods and software algorithms to determine the optical constants and optical quality of the system in a light transmitted medium. The intrinsic optical constants are useful parameters for determining how much light can transmit and reflect through the medium. However, without the use of one or more embodiments described herein, these constants are very difficult to measure unless a complex, very expensive measurement system is used, which may include one or more measurement devices at very high cost, require a user learning curve, produce reflectance and transmittance only, and require controlled lab control conditions for use (and thus, e.g., cannot be used on-site, such as at the receiving dock, for inspection of components).

One or more embodiments allow for an easy, in-situ method to test incoming components and manufactured systems either during or after the assembly process or installed in the end product, and to quickly conduct design and optimization trade studies for optical systems under consideration. For example, one or more embodiments can perform a quality check and/or non-destructive inspection to determine if the as manufactured part and in service performance of the part meets specified design and operation criteria. Using one or more embodiments described herein, test costs are reduced or minimized and expensive hardware and complex test procedures to obtain optical constants are eliminated.

One embodiment includes a system 20 shown in FIG. 1 wherein optical constants are determined using simple spectroscopy measurements. In particular, the system 20 includes a spectrophotometer 22 to determine optical constants. For example, the spectrophotometer 22 may be embodied as a simple spectrophotometry device that is used instead of a complex and expensive ellipsometry device. The spectrophotometer 22 in various embodiments is any type of photometer that can measure intensity as a function of the light source wavelength. It should be noted that the spectrophotometer 22 may operate within a spectral bandwidth and linear range of absorption or reflectance based on the measurements to be performed or particular application. In various embodiments, the spectrophotometer 22 is any device capable of performing spectrophotometry including the quantitative measurement of the reflection or transmission properties of a material (e.g., window pane) as a function of wavelength.

One or more methods that will be described herein may be performed by the system 20 that uses the reflectance and transmittance information to calculate optical constants. For example, optical constant determination may be implemented, and/or performed, for example, as part of a system 20, which may be a computing system that includes or is coupled to the spectrophotometer 22. It should be appreciated that although different components blocks are shown in FIG. 1, one or more of the components may be combined or separated. Additionally, one or more components shown in FIG. 1 may be contained within the same housing or different housings.

The various embodiments, including the spectrophotometer 22, may be implemented in connection with different computing systems. Thus, while a particular computing or operating environment may be described herein, the computing or operating environment is intended to illustrate operations or processes that may be implemented, performed, and/or applied to a variety of different computing or operating environments.

Thus, FIG. 1 schematically illustrates a non-limiting example of a computing system, configured in this embodiment as part of or embodied as the system 20 to obtain optical constants for a material 24 (e.g., a glass or acrylic material forming part of an aircraft window pane) having one or more light transmitted mediums and that may perform one or more methods or processes as described in more detail herein. The system 20 may be provided, for example, as any type of measurement or computing device, including, but not limited to, personal measurement or computing systems, among others, which may be portable in some embodiments.

In the illustrated embodiment, the system 20 includes a processor 26 (which may be a processor unit) that may be any type of computing or processing system operably coupled to the spectrophotometer 22. The system 20 also includes a logic subsystem 28, a storage subsystem 30 operatively coupled to the logic subsystem 28, one or more user input devices 32, and a display subsystem 34. The system 20 may optionally include components not shown in FIG. 1, and/or some components shown in FIG. 1 may be peripheral components that do not form part of or are not integrated into the computing system. Also, one or more of the components may be embodied within or form part of other components. For example, the logic subsystem 28 may be embodied within or as the processor 26 or the processor 26 may be embodied within or as the logic subsystem 28.

The logic subsystem 28 may include one or more physical devices configured to execute one or more instructions. For example, the logic subsystem 28 may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem 28 may include one or more processors and/or computing devices that are configured to execute software instructions. Additionally or alternatively, the logic subsystem 28 may include one or more hardware or firmware logic machines configured to execute hardware or firmware instructions. The logic subsystem 28 may optionally include individual components that are distributed throughout two or more devices, which may be remotely located in some embodiments.

The storage subsystem 30 may include one or more physical devices (that may include one or more memory areas) configured to store or hold data (e.g., spectrophotometry measurement data) and/or instructions executable by the processor 26 or logic subsystem 28 to implement one or more processes or methods described herein. When such processes and/or methods are implemented, the state of the storage subsystem 30 may be transformed (e.g., to store different data or change the stored data). The storage subsystem 30 may include, for example, removable media and/or integrated/built-in devices. The storage subsystem 30 also may include, for example, other devices, such as optical memory devices, semiconductor memory devices (e.g., RAM, EEPROM, flash, etc.), and/or magnetic memory devices, among others. The storage subsystem 30 may include devices with one or more of the following operating characteristics: volatile, nonvolatile, dynamic, static, read/write, read-only, random access, sequential access, location addressable, file addressable, and content addressable. In some embodiments, the logic subsystem 28 and the storage subsystem 30 may be integrated into one or more common devices, such as an application specific integrated circuit or a system on a chip. Thus, the storage subsystem 30 may be provided in the form of computer-readable removable media in some embodiments, which may be used to store and/or transfer data and/or instructions executable to implement the various embodiments described herein, including the processes and methods.

In various embodiments, the one or more user input devices 32 may be one or more different types of devices, such as a keyboard, mouse, or trackball, among others. However, it should be appreciated that that other user input devices 32, such as other external user input devices or peripheral devices be used, which may form part of the spectrophotometer 22. A user is able to interface or interact with the system 20 using the one or more input devices 32 (e.g., select or input data).

Additionally, in various embodiments, the display subsystem 34 (e.g., one or more displays or monitors) may be provide to display information or data (e.g., determined optical constants for light transmitted mediums) as described herein. For example, the display subsystem 34 may be used to present a visual representation of an output or data stored by the storage subsystem 30. In operation, the processes and/or methods described herein change the data stored by the storage subsystem 30, and thus transform the state of the storage subsystem 30. The state of the display subsystem 34 may likewise be transformed to visually represent changes in the underlying data. The display subsystem 34 may include one or more display devices (one of which may form part of the spectrophotometer 22) and may be combined with the logic subsystem 28 and/or the storage subsystem 30, such as in a common housing, or such display devices may be separate or external peripheral display devices.

Figure 2:
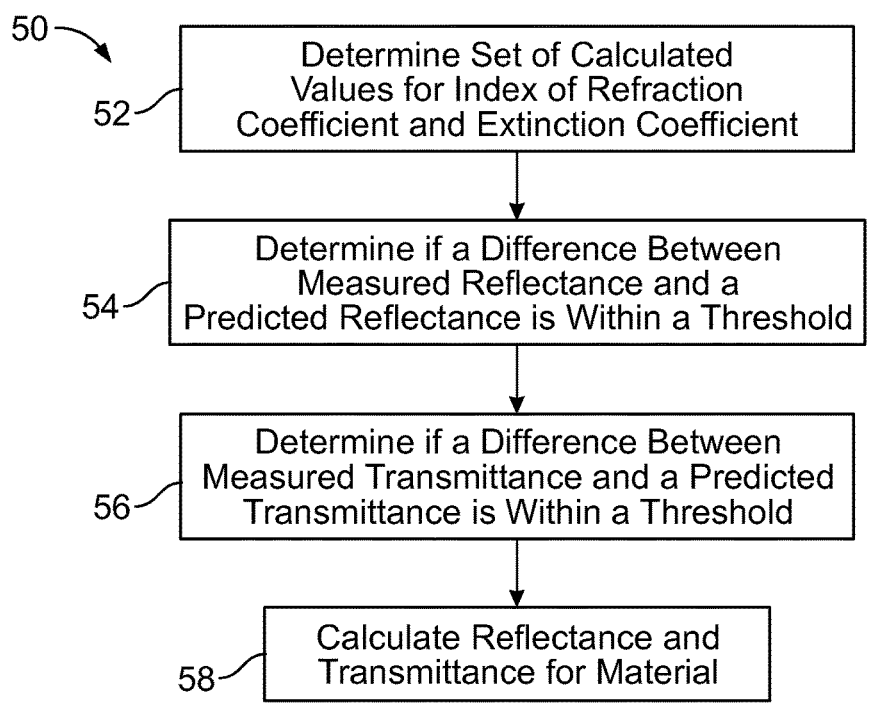
FIG. 2 is a block diagram of a method of using the system of FIG. 1 in accordance with an embodiment to determine optical properties.
Figure 5:
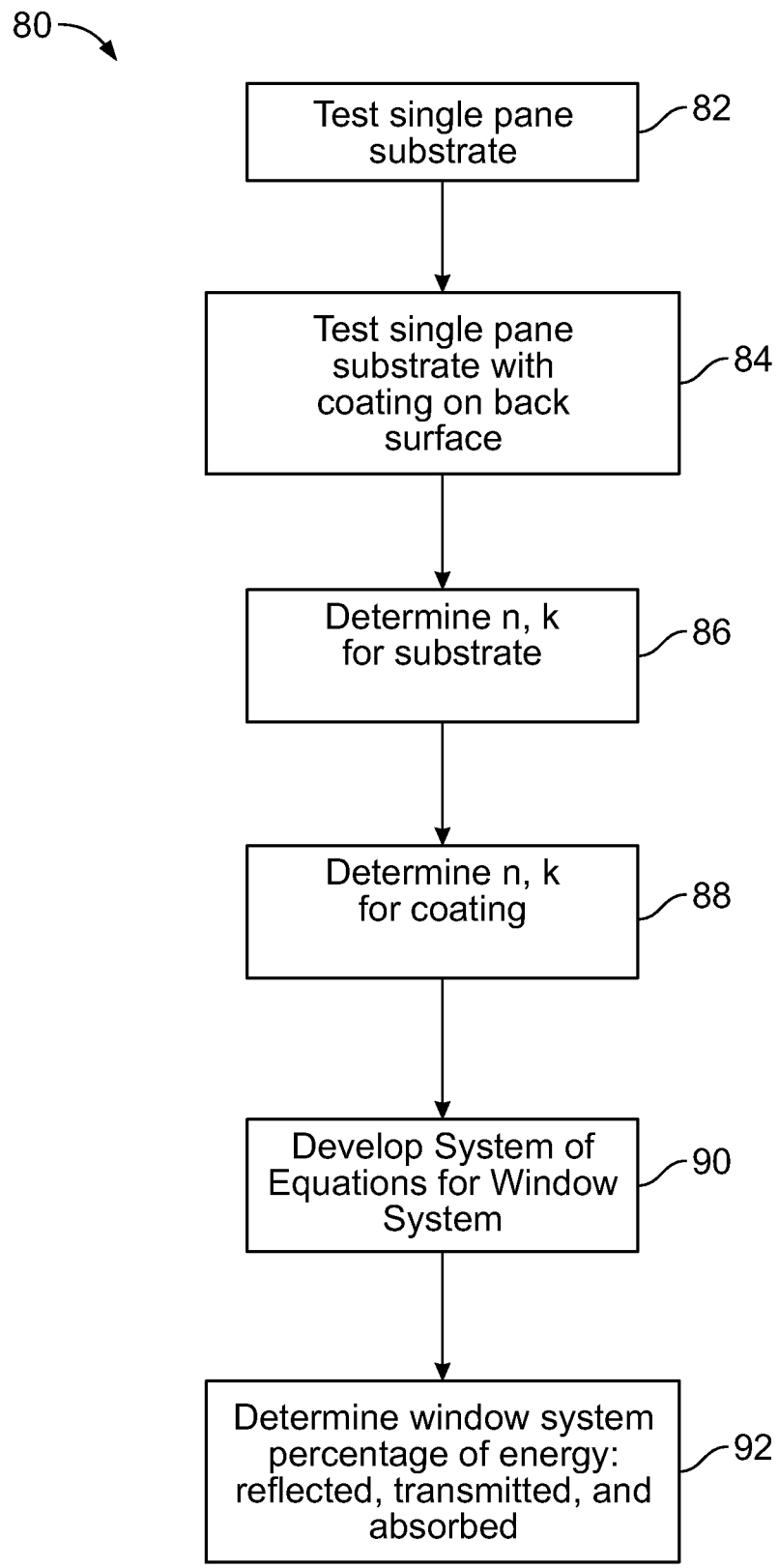
FIG. 5 is a block diagram of a method using the system of FIG. 1 in accordance with an embodiment to determine optical properties of a window system.
Figure 6:
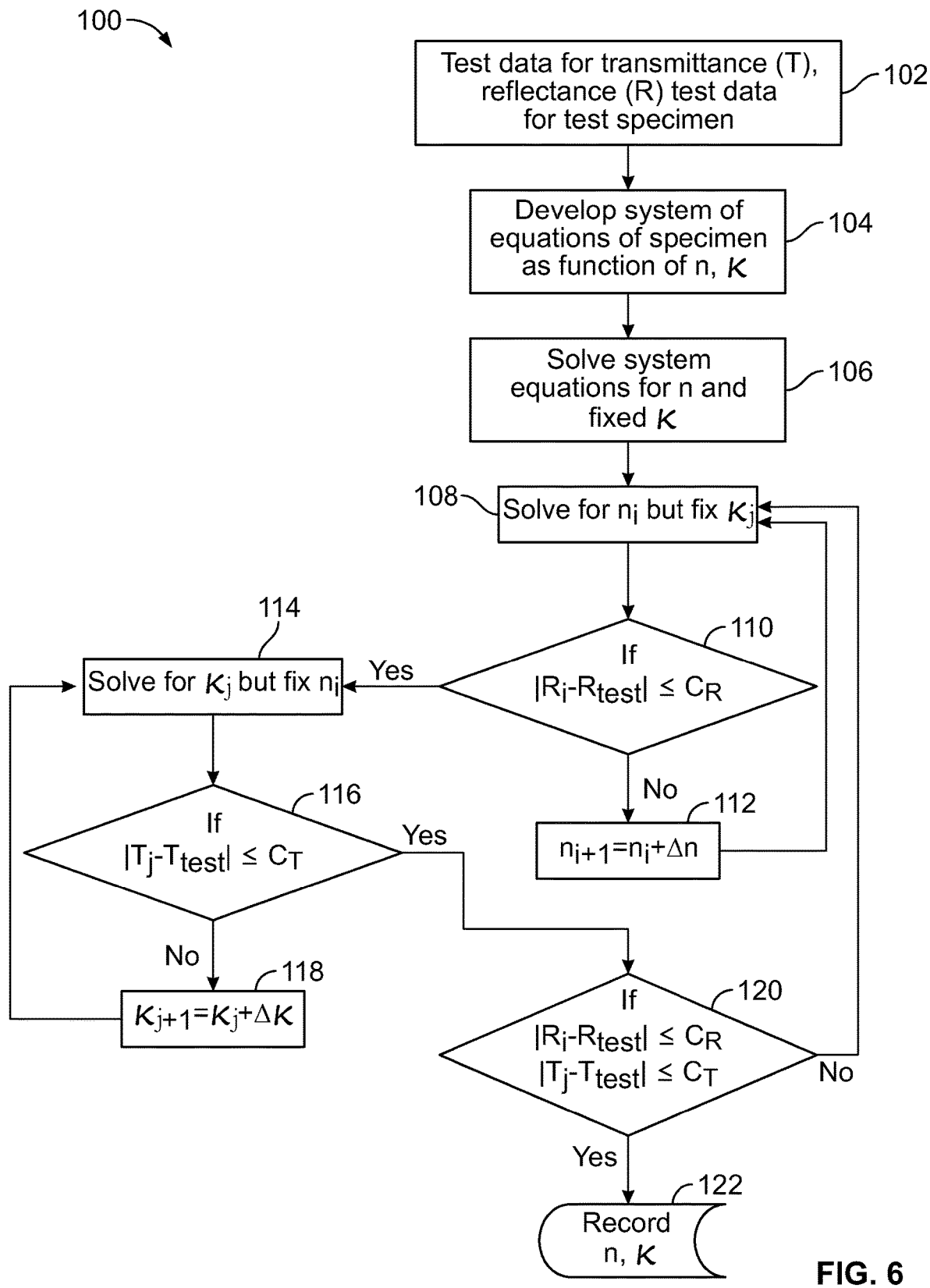
FIG. 6 is a block diagram of a method using the system of FIG. 1 in accordance with an embodiment to determine an index of refraction coefficient and an extinction coefficient of a window system.

Thus, the various components, sub-systems, or modules of the system 20 may be implemented in hardware, software, or a combination thereof, as described in more detail herein. Additionally, the processes, methods, and/or algorithms described herein may be performed using one or more processors, processing machines or processing circuitry to implement one or more methods described herein (such as illustrated in FIGS. 2, 5, and 6).

In various embodiments, the logic subsystem 28 receives as inputs reflectance and transmittance information acquired by the spectrophotometer 22 to calculate one or more optical constants of the material 24. It should be noted that the algorithms from the methods and processes described herein can be implemented in different systems, as well as added to any spectrophotometry device to enhance the capabilities thereof. For example, the system 20 may be configured as test equipment that provides optical constants output in addition to reflectance and transmittance. The test equipment can be a handheld wireless hardware or a computer and monitoring system. In some embodiments, the test equipment, which may be embodied as some or all of the system 20 may include built-in software to allow a user to identify the light transmitted medium configuration.

In one embodiment, the logic subsystem 28 implements a net radiation method to formulate a mathematical model and calculate system and component reflectance (R), transmittance (T), and/or absorption (A). In operation, the logic subsystem 28 (which may form part of test equipment) can quickly simulate a trade study for various system configurations.

In some embodiments, the system 20 can also perform precise measurements of the thickness of the components for a given known database of indices of refraction coefficient (n) and extinction coefficients (κ) that may be stored in the storage subsystem 30. In some embodiments, NDE results are provided that assess the optical quality of the components and systems.

As described in more detail herein, for a multi-pane window application, the logic subsystem 28 uses reflectance and transmittance test data from single pane substrates of interest and single panes with coatings of interest, and then uses an algorithm to determine substrate and coating intrinsic optical characteristics at each electromagnetic wavelength. In some embodiments, the algorithm uses a database of known optical properties for materials of interest. Once the optical characteristics and optical quality of each individual transmitted medium is determined, then trade study and optimization for more complex transmitted medium systems (e.g., window assemblies) can be conducted by this net radiation technique. In various embodiments, imperfections of the optical system may be characterized, and any design being evaluated whether a proposed system or one currently in production, can be quickly be assessed, and any design or optimization studies needed can include intrinsic optical characteristics and manufacturing effects. As a result, in a window application, numerous window configuration studies and design iterations can be conducted in rapid succession, with final validation performed by testing through one configuration instead of each configuration that would require elaborate and expensive testing. Hence, the cost and turnaround time for assessing existing systems or for the development of advanced window systems is greatly reduced.

Various embodiments provide a method 50 as shown in FIG. 2 to determine the optical properties for light transmitted mediums, such as for plural substrates of a particular material. The method 50, for example, may employ structures or aspects of various embodiments (e.g., systems and/or methods, such as the system 20) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 50 may be able to be used as one or more algorithms to direct hardware to perform operations described herein.

A general description of determining optical properties will be provided in connection with the method 50, followed by a more detailed description. The method 50 may be performed to determine the index or refraction coefficient and extinction coefficient for materials having unknown optical constants. The method 50 includes at 52 determining a set of calculated values for the index of refraction coefficient (n) and extinction coefficient (κ) for a material of interest. The set of calculated values are determined from plural measured values for reflectance and transmittance that may be measured using a spectrophotometer device (e.g., the spectrophotometer 22 shown in FIG. 1) configured to provide one or more measured values indicative of a reflectance for a particular material specimen, and one or more values indicative of a transmittance for the particular material specimen. As described in more detail herein, the set of calculated values may be used to select an optimum index of refraction coefficient and extinction coefficient, respectively, that correspond to a minimum difference between measured and predicted reflectance and a minimum difference between measured and predicted transmittance.

The method 50 determines at 54 if a difference between measured reflectance and a predicted reflectance is within a threshold. For example, at 54, a determination is made if a difference between measured reflectance and a predicted reflectance computed using a selected calculated value for the index of refraction coefficient is less than or equal to a threshold. If the difference is less than or equal to the threshold, the selected calculated value is identified as the index of refraction coefficient. If the difference is not less than the threshold, then the determination (e.g., changing the selected calculated value) is repeated until a selection from the set of calculated values results in a difference that is less than or equal to the threshold.

The method 50 determines at 56 if a difference between measured transmittance and a predicted transmittance is within a threshold. For example, at 56, a determination is made if a difference between measured transmittance and a predicted transmittance computed using a selected calculated value for the index of extinction coefficient is less than or equal to a threshold. If the difference is less than or equal to the threshold, the selected calculated value is identified as the index of extinction coefficient. If the difference is not less than or equal to the threshold, then the determination (e.g., changing the selected calculated value) is repeated until a selection from the set of calculated values results in a difference that is less than or equal to the threshold.

The method 50 also calculates at 58 the reflectance and transmittance for the substrates of the material. For example, the identified calculated values for the index of refraction coefficient and extinction coefficient below or equal to the thresholds as determined at 54 and 56 are used to generate and output a calculation of the reflectance and transmittance of the material, which may include a substrate and coating.

Figure 4:
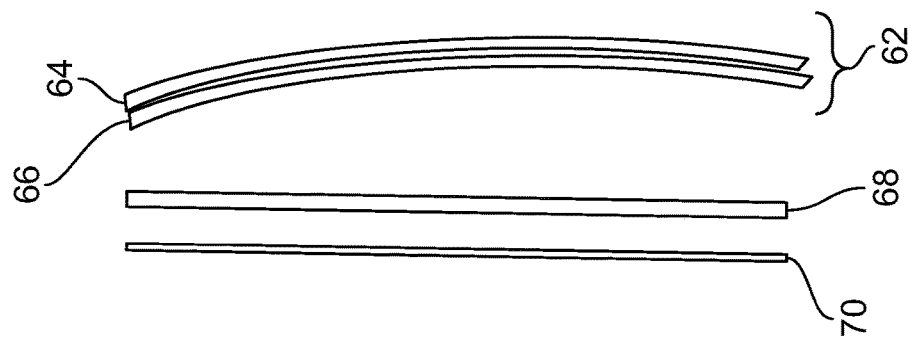
FIG. 4 is a block schematic diagram of the window system of FIG. 3.
Figure 3:
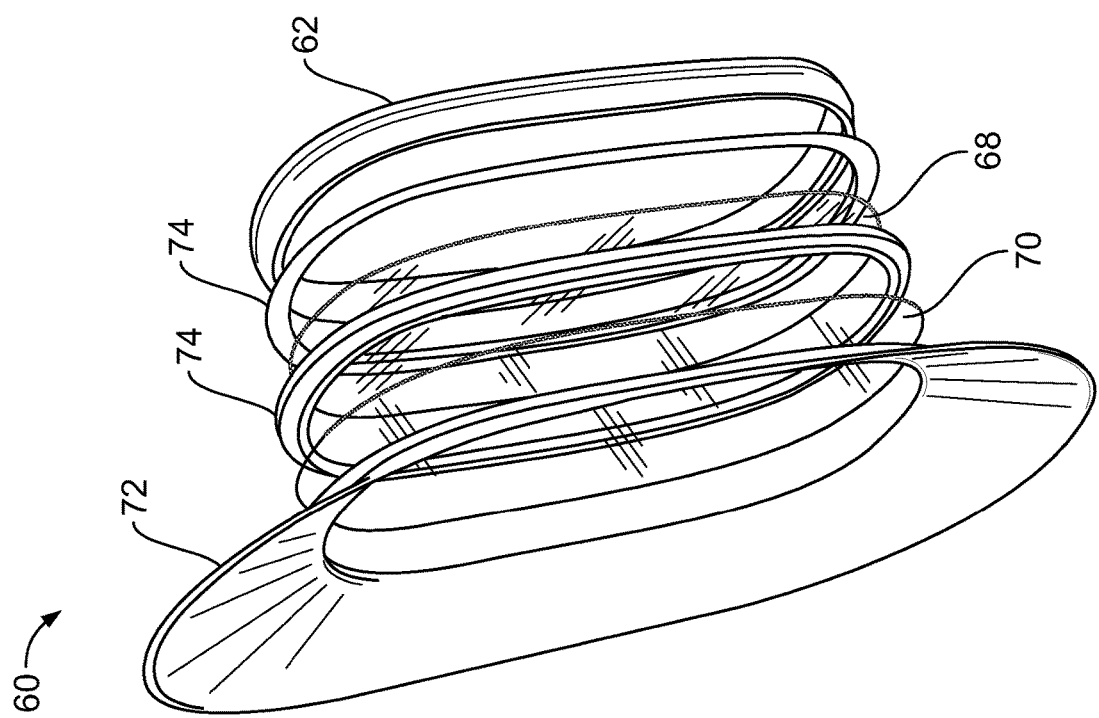
FIG. 3 is an illustration of a window system having different optical properties.

The method 50 may be used to determine the optical properties, including the optical constants (n,κ) for a window system 60, such as illustrated in FIGS. 3 and 4. For example, the method 50 may be used to determine the reflectance and transmittance of a substrate and coating of one or more components of the window system 60. The window system 60 may be configured, for example, for use in an aircraft, such as a commercial airliner. The window system 60 generally includes a window pane 62 formed from a window outer pane 64 and a window inner pane 66. As can be seen, the portions of the window pane are arranged in a stacked configuration with the window outer pane 64 and window inner pane 66 adjacent each other. An electronic dimmable window 68 is positioned adjacent the window pane 62 and which may be selectively dimmed. A dust cover 70 is positioned adjacent the electronic dimmable window 68 such that the electronic dimmable window 68 is between the dust cover 70 and the window pane 62. Thus, the window pane 62 forms an outer surface when coupled with an aircraft fuselage and the dust cover 70 forms an inner surface within the passenger cabin.

Additional components may be provided. For example, an inner reveal 72 may be provided adjacent the dust cover 70. The inner reveal 72 provides an aesthetic cover for the window assembly 60 within the aircraft cabin. Additionally, one or more support frames 74 may be positioned within the window system 60, illustrated between the window pane 60 and electronic dimmable window 68, as well as between the electronic dimmable window 68 and the dust cover 70. However, it should be noted that the configuration and positioning of the support frames 74 may be varied as desired or needed. It also should be noted that the different panes within the window system 60 may be formed from different materials, such as glass or acrylic, among others.

FIG. 5 illustrates a method 80 to determine the reflectance and transmittance of a single pane substrate, as well as a coating on the substrate (e.g., aft or front side of the pane). FIG. 6 illustrates a method 100 to determine the optical constants (n,κ) for the substrate and/or coating. In the methods 80 and 100, the reflectivity of a layer is defined as:

$$\rho_1 = \frac{(n_2 - n_1)^2 + (\kappa_2 - \kappa_1)^2}{(n_2 + n_1)^2 + (\kappa_2 + \kappa_1)^2},\qquad \text{Equation 1}$$

the transmissivity of a layer is defined as:

$$\tau_1 = \exp(-a_1 L) \qquad \text{Equation 2,}$$

with the absorption coefficient (a) defined as:

$$a_1 = \frac{4\pi\kappa_1}{\lambda} \qquad \text{Equation 3}$$

wherein κ is the coefficient of extinction, λ is the wavelength of light, and n is the index of refraction.

Figure 7:
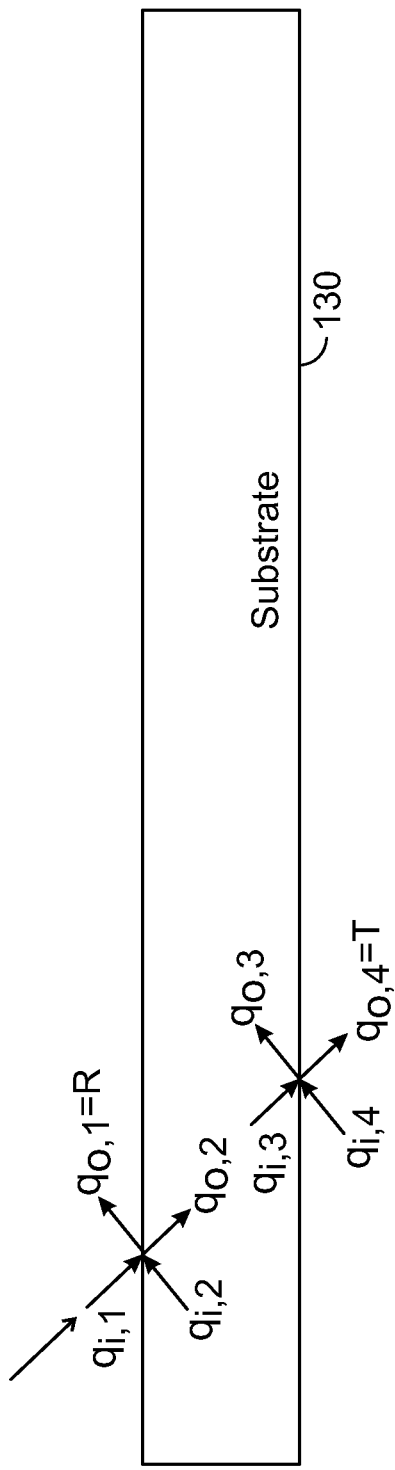
FIG. 7 is an illustration of determining optical properties for a single substrate using the system of FIG. 1 in accordance with an embodiment.

With particular reference now to FIG. 5, the method 80 tests a single pane substrate at 82. For example, a single pane substrate 130 is shown in FIG. 7. The single pane substrate 130 may form part of the window pane 62 (shown in FIGS. 3 and 4). The single pane substrate 130 may be tested using the spectrophotometer 22 (shown in FIG. 2) to acquire one or more measured values indicative of a reflectance (R) and transmittance (T) for the single pane substrate 130. The optical equations that define the optical properties of the single pane substrate 130 will now be described. In particular, the reflectance of the single pane substrate 130, which is the ratio of energy reflected of a single pane to energy incident thereon is defined as follows:

$$R = \rho_s\left[1 + \frac{(1-\rho_s)^2 \tau_s^2}{1 - \rho_s^2 \tau_s^2}\right], \qquad \text{Equation 4}$$

and the transmittance of the single pane substrate 130, which is the ratio of energy transmitted of the single pane to energy incident thereon is defined as:

$$T = \tau_s\left[\frac{(1-\rho_s)^2}{1 - \rho_s^2 \tau_s^2}\right], \qquad \text{Equation 5}$$

where, $$\rho_s = \frac{(n_s - 1)^2 + \kappa_s^2}{(n_s + 1)^2 + \kappa_s^2}, \qquad \text{Equation 6}$$

$$\tau_s = \exp\left(-\frac{4\pi\kappa_1}{\lambda}L\right), \qquad \text{Equation 7}$$

wherein "s" denotes substrate, ρ is a function of (n, κ) and τ is a function of κ.

As should be appreciated, R and T are known inputs and Equations 4-7 are non-linear and solve for $n_s$, $\kappa_s$.

Figure 8:
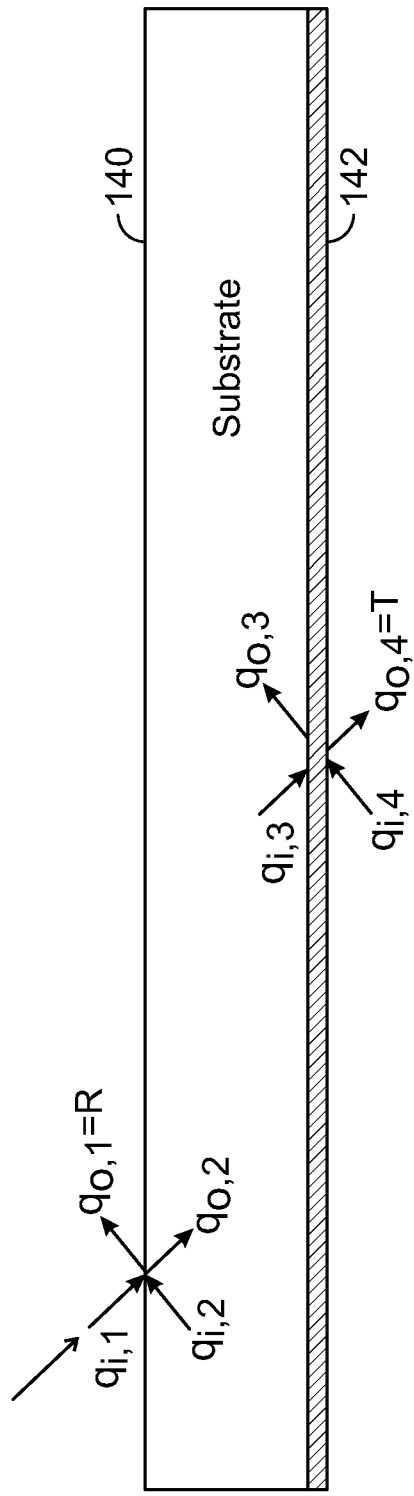
FIG. 8 is an illustration of determining optical properties for a single substrate with a coating using the system of FIG. 1 in accordance with an embodiment.

With particular reference again to FIG. 5, the method 80 tests a single pane substrate with a coating thereon, such as a back surface, at 84. For example, a single pane substrate 140 with a coating 142 is shown in FIG. 8. The single pane substrate 140 may form part of the window pane 62 (shown in FIGS. 3 and 4). The single pane substrate 140 and coating 142 may be tested using the spectrophotometer 22 (shown in FIG. 2) to acquire one or more measured values indicative of a reflectance (R) and transmittance (T) for the single pane substrate 140 and coating 142. The optical equations that define the optical properties of the single pane substrate 140 with the coating 142 will now be described. In particular, the reflectance of the single pane substrate 140 with the coating 142, which is the ratio of energy reflected of a single pane to energy incident thereon is defined as follows:

$$R = \rho_s - (1-\rho_s)\tau_s^2\rho_c\left[\frac{(1-\rho_s)}{1 - \rho_s^2\rho_c\tau_s^2}\right] \qquad \text{Equation 8}$$

and the transmittance of the single pane substrate 140 with the coating 142, which is the ratio of energy transmitted of the single pane to energy incident thereon is defined as:

$$T = (1-\rho_c)\tau_c\tau_s\left[\frac{(1-\rho_s)}{1 - \rho_s\rho_c\tau_s^2}\right] \qquad \text{Equation 9}$$

where, $$\tau_s = \exp\left(-\frac{4\pi\kappa_s}{\lambda}L\right) \qquad \text{Equation 10}$$

$$\tau_c = \exp\left(-\frac{4\pi\kappa_c}{\lambda}L\right) \qquad \text{Equation 11}$$

$$\rho_s = \frac{(n_s - 1)^2 + \kappa_s^2}{(n_s + 1)^2 + \kappa_s^2} \qquad \text{Equation 12}$$

$$\rho_c = \frac{(n_c - n_s)^2 + (\kappa_c - \kappa_s)^2}{(n_c + n_s)^2 + (\kappa_c + \kappa_s)^2} \qquad \text{Equation 13}$$

wherein "s" denotes substrate, "c" denotes coating, ρ is a function of (n,k) and τ is a function of κ.

It should be noted that once $n_s$ and $\kappa_s$ are known, $n_c$ and $\kappa_c$ are solved for iteratively.

With reference again to FIG. 5, the method 80 determines n, κ for the substrate at 86 and determines n, κ for the coating at 88. For example, n, κ for the single plane substrate 130 or 140 is determined at 86 and n, κ for the coating 142 is determined at 88. The determinations at 86 and 88 in one embodiment are performed as illustrated by the method 100 shown in FIG. 6. In various embodiments, each q (as shown in FIGS. 7 and 8) is solved for energy passing through each layer, for example, each substrate and coating.

The method 100 acquires test data for transmittance and reflectance for the test specimen at 102. For example, as described herein, the spectrophotometer 22 is used to acquire transmittance and reflectance indicative measurements for each of the substrate(s) and coating(s). The method 100 includes at 106 developing a system of equations for the specimen as a function of n, κ. In one embodiment, the equations are defined, for example, as described in connection with FIGS. 7 and 8. For example, the system of equations for a single substrate, such as the single pane substrate 130 (shown in FIG. 7) is defined by Equations 4-7. For a single substrate with a coating, such as the single pane substrate 140 with coating 142 (shown in FIG. 8), the system of equations is defined by Equations 8-13. As can be seen in FIGS. 7 and 8, a set of "q" may be defined at different interfaces, such as interface surfaces, of the substrate 130 or 140, such as at one or more surfaces of the substrate 130 or 140. For example, the vector values (q) are used to determine the optical characteristics at each layer of the substrate and/or coating. The optical characteristics are determined as s function of wavelength in various embodiments.

The method 100 solves the system of equations at 106 for n and a fixed κ. For example, a matrix solution is performed for a set of matrices at each of the surfaces. In some embodiments, matrix algebra is performed for the set of matrices, which results in calculated optical weights. In various embodiments, the method 100 solves for $n_i$ with a fixed $κ_j$ at 108. As used herein, including with reference to the method 100, the variables are defined as follows:

κ: extinction coefficient;
n: index of refraction;
$C_R$: convergent tolerance for total percentage reflected energy (R);
$C_T$: convergent tolerance for total percentage transmitted energy (T);
Δκ: extinction coefficient increment; and
Δn: index of refraction increment.

A determination is then made at 110 as to whether the absolute value of $R_i-R_{test}$ is less than or equal to $C_R$. In this step, a determination is made as to whether the difference between the measured reflectance and the predicted reflectance is within a threshold value, which in this embodiment is less than or equal to the convergent tolerance for the total percentage of reflected energy. If the absolute value is not less than or equal to the threshold value, then the index of refraction is incremented at 112 and the solving at 108 performed again using the updated n, which is $n_{i+1}=n_i+Δn$. This iterative process is repeated until a determination is made at 110 that the difference between the measured reflectance and the predicted reflectance is within the threshold value, which is less than or equal to the convergent tolerance for the total percentage of reflected energy. When such a determination is made at 110, then at 114, the method 100 solves for $κ_j$ with a fixed $n_i$.

Similar to step 110, a determination is them made at 116 as to whether the absolute value of $T_i-T_{test}$ is less than or equal to $C_T$. In this step, a determination is made as to whether the difference between the measured transmittance and the predicted transmittance is within a threshold value, which in this embodiment is less than or equal to the convergent tolerance for the total percentage of transmitted energy. If the absolute value is not less than or equal to the threshold value, then the coefficient of extinction is incremented at 118 and the solving at 114 performed again using the updated κ, which is $κ_{j+1}=κ_j+Δκ$. This iterative process is repeated until a determination is made at 116 that difference between the measured transmittance and the predicted transmittance is within the threshold value, which is less than or equal to the convergent tolerance for the total percentage of transmitted energy. When such a determination is made at 116, then a determination is made at 120 if the absolute value of $R_i-R_{test}$ is less than or equal to $C_R$ and the absolute value of $T_i-T_{test}$ is less than or equal to $C_T$. If either one of the values is not less than or equal to the respective threshold values, then the solving at 108 is again performed, and the iterative process may be repeated as needed. If both of the values are less than or equal to the respective threshold values, then at 122, the method records n, κ. For example, calculated values for the index of refraction coefficient (n) and the index of extinction coefficient (κ) are recorded, such as stored in the storage subsystem 30 (shown in FIG. 1). These values are then used to generate and output a calculation of the reflectance and transmittance for the substance of the particular material.

Figure 9:
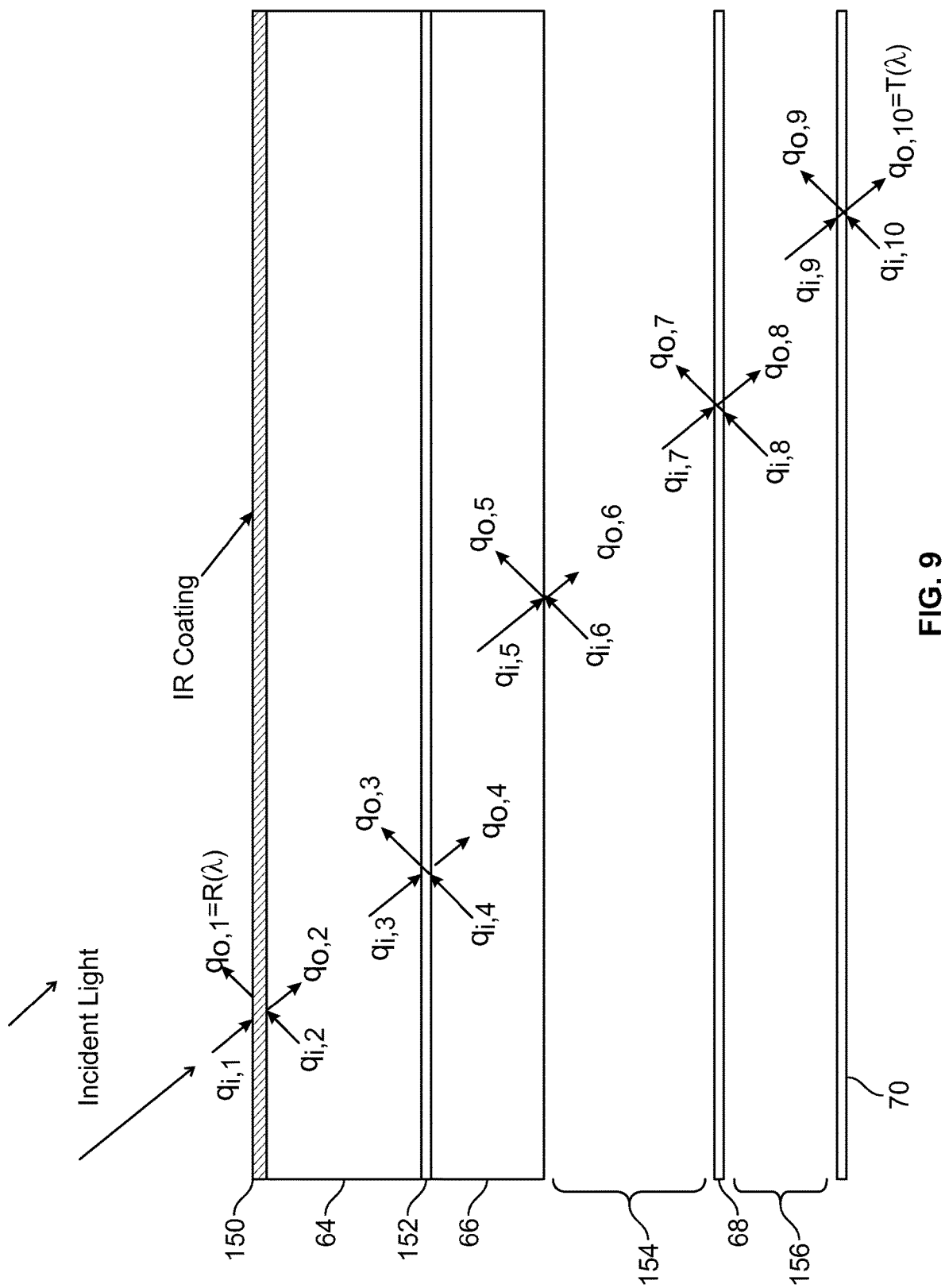
FIG. 9 is an illustration of determining optical properties for an overall window system using the system of FIG. 1 in accordance with an embodiment.

In particular, and with reference again to FIG. 5, with n, κ determined for each substrate and coating, an overall system of equations is developed. For example, in the illustrated embodiment, the method 80 develops a system of equations for the window system at 90. A system of equations may be developed for the window system 60 (shown in FIGS. 3 and 4). For example, a system of equations may be written and solved for a complex window configuration by solving the energy equation matrices at each of the layers to define a net radiation calculation, such as for the window system 60 as shown in FIGS. 3 and 4. As can be seen in FIG. 9, wherein like numerals represent like parts with FIGS. 3 and 4, a system of equations may be defined at each surface, including at surfaces adjacent air gaps 152, 154, and 156. For each of the surfaces or interfaces, a set of "q" values is determined as described herein, wherein n, κ for all components are known, such that the system of equations for the overall window system 60 can be written and solved (e.g., matrix algebra solution). Thereafter, different optical properties may be determined as described herein. For example, a window system percentage of energy for reflected, transmitted, and/or absorbed energy may be determined at 92.

For individual components with appreciable thickness, reflected light can be determined by its $q_{o,n}$ on outermost surface (closer to incident light surface) and transmitted light can be determined by its $q_{o,n+3}$ at surface away from incident light. The absorbed light can be determined by the sum of input energy minus the sum of output energy at each component:

$$\text{Absorptance}=(q_{i,n}+q_{i,n+3})-(q_{o,n}+q_{o,n+3})$$

For a component with negligible thickness, reflected light is $q_{o,n}$ and transmitted light is $q_{i,n+1}$. Absorption is $(q_{i,n}+q_{i,n+1})-(q_{o,n}+q_{o,n+1})$ In some embodiments, a decision tree may be defined for each of the interfaces that iteratively selects a value from the set of values for the index of refraction coefficient and the extinction coefficient for use in iteratively determining if the difference between the measured and predicted reflectance or transmittance computed from the selected value is less than or equal to the threshold. Using this iterative process, a select calculated value is identified for the index of refraction coefficient and the extinction coefficient corresponding to the difference that is less than or equal to the threshold.

Various embodiments may be used to determine the optical parameters for different window configurations having different combinations of, for example, IR coating location, IR coating types, window operational modes, etc. Additionally, various embodiments allow for the assessment of thermal impact (temperature) of solar heating to the window system by using calculated total percentage of energy absorbed by each window component, such as the window panes, electronic dimmable window, dust cover, etc.

In various embodiments, different operational modes of a window system may be easily evaluated. For example, different states of the electronic dimmable window may be evaluated to determine the optical properties at each of the states. The reflectance and transmittance of the overall window system may be determined, as well as the total absorption by the window system (as well as the absorption by each of the individual components). In some embodiments, numerous window configuration studies and design iterations can be conducted in rapid succession, with final validation by testing through one configuration instead of each configuration requiring elaborate and expensive testing. Thus, the cost and turnaround time for assessing existing systems or for the deployment of advanced window systems may be greatly reduced.

Various embodiments enable fast assessment of the optical properties and optical quality of both proposed and existing systems at a reduced cost. Additionally, the viability of different airplane window configurations and other opto-electrical systems associated with an aircraft may be quickly assessed.

The disclosure and drawing figure(s) describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Figure 10:
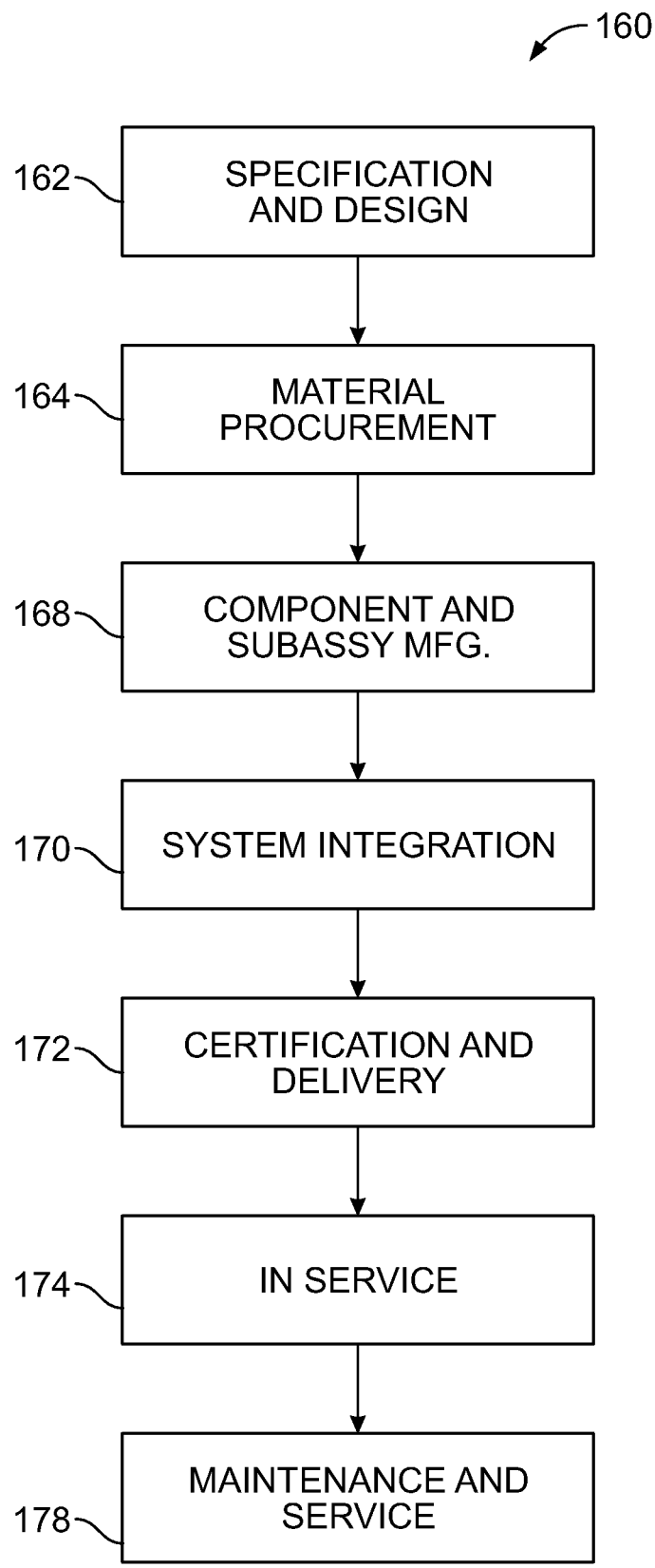
FIG. 10 is a block diagram of aircraft production and service methodology.
Figure 11:
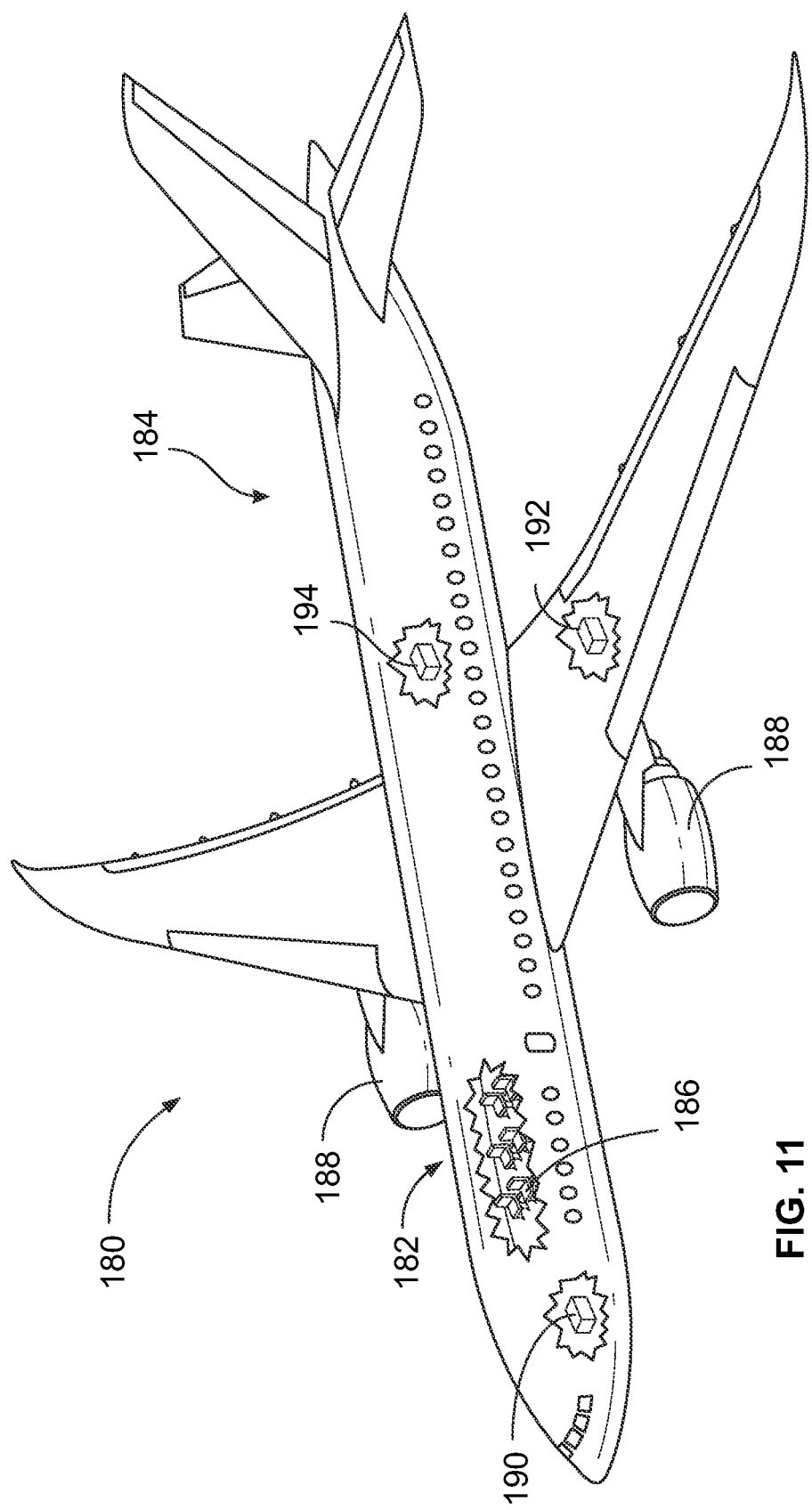
FIG. 11 is a schematic perspective view of an aircraft.

Examples of the disclosure may be described in the context of an aircraft manufacturing and service method 160 as shown in FIG. 10 and an aircraft 180 as shown in FIG. 11. During pre-production, illustrative method 160 may include specification and design 162 of the aircraft 180 and material procurement 164. During production, component and subassembly manufacturing 166 and system integration 168 of the aircraft 180 take place. Thereafter, the aircraft 180 may go through certification and delivery 170 to be placed in service 172. While in service by a customer, the aircraft 180 is scheduled for routine maintenance and service 174 (which may also include modification, reconfiguration, refurbishment, and so on).

Each of the processes of the illustrative method 160 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown FIG. 11, the aircraft 180 produced by the illustrative method 160 may include an airframe 182 with a plurality of high-level systems 184 and an interior 186. Examples of high-level systems 184 include one or more of a propulsion system 188, an electrical system 190, a hydraulic system 192, and an environmental system 194. Any number of other systems may be included. Although an aerospace example is shown, the principles may be applied to other industries, such as the automotive industry.

Apparatus and methods shown or described herein may be employed during any one or more of the stages of the manufacturing and service method 160. For example, components or subassemblies corresponding to component and subassembly manufacturing 166 may be fabricated or manufactured in a manner similar to components or subassemblies produced while the aircraft 180 is in service. Also, one or more aspects of the apparatus, method, or combination thereof may be utilized during the production states 166 and 168, for example, by substantially expediting assembly of or reducing the cost of an aircraft 180. Similarly, one or more aspects of the apparatus or method realizations, or a combination thereof, may be utilized, for example and without limitation, while the aircraft 180 is in service, e.g., maintenance and service 174.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

It should be noted that the various embodiments may be implemented in hardware, software or a combination thereof. The various embodiments and/or components, for example, the modules, or components and controllers therein, also may be implemented as part of one or more computers or processors or field-programmable gate arrays (FPGAs). The computer or processor or FPGA may include a computing device, an input device, a display unit and an interface, for example, for accessing the Internet. The computer or processor may include a microprocessor. The microprocessor may be connected to a communication bus. The computer or processor or FPGA may also include a memory. The memory may include Random Access Memory (RAM) and Read Only Memory (ROM). The computer or processor or FPGA further may include a storage device, which may be a hard disk drive or a removable storage drive such as an optical disk drive, and the like. The storage device may also be other similar means for loading computer programs or other instructions into the computer or processor.

As used herein, the terms "system," "circuit," "component," or "module" may include a hardware and/or software system that operates to perform one or more functions. For example, a module, circuit, component, or system may include a computer processor, controller, or other logic-based device that performs operations based on instructions stored on a tangible and non-transitory computer readable storage medium, such as a computer memory. Alternatively, a module, circuit, component, or system may include a hard-wired device that performs operations based on hard-wired logic of the device. The modules or circuits or components shown in the attached figures may represent the hardware that operates based on software or hardwired instructions, the software that directs hardware to perform the operations, or a combination thereof.

The block diagrams of embodiments herein illustrate various blocks labeled "circuit" or "module." It is to be understood that the circuits or modules may be implemented as hardware with associated instructions (e.g., software stored on a tangible and non-transitory computer readable storage medium, such as a computer hard drive, ROM, RAM, or the like) that perform the operations described herein. The hardware may include state machine circuitry hard wired to perform the functions described herein. Optionally, the hardware may include electronic circuits that include and/or are connected to one or more logic-based devices, such as microprocessors, processors, controllers, or the like. Optionally, the modules may represent processing circuitry such as one or more FPGAs, application specific integrated circuit (ASIC), or microprocessor. The circuit modules in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, the embodiments are by no means limiting and are exemplary embodiments. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for determining optical properties for a plurality of window configurations for window systems, wherein each of the window systems has a window outer pane and a window inner pane, the method comprising:

acquiring one or more measured values with a spectrophotometer indicative of a reflectance for a material of the plurality of window configurations for the window systems;

acquiring one or more measured values with a spectrophotometer indicative of a transmittance for the material;

determining a set of calculated values for an index of refraction coefficient and an extinction coefficient from the one or more measured values indicative of reflectance and transmittance, respectively;

identifying a calculated value from the set of calculated values for the index of refraction coefficient and a calculated value from the set of calculated values for the extinction coefficient that are within a threshold determined by the difference between the one or more measured values indicative of the reflectance or transmittance and a predicted reflectance or transmittance, respectively;

determining a reflectance and transmittance for the material using the calculated values identified within the threshold;

determining a percentage of one or more of reflected, transmitted or absorbed energy for the material of the plurality of window configurations for the window systems; and identifying from one or more of the reflectance, the transmittance, or the percentage an optimum window configuration for the window systems that is selected to obtain validation by testing one identified window configuration instead of each of the window configurations.

2. The method of claim 1, further comprising iteratively changing the calculated values for the index of refraction coefficient and the extinction coefficient until both values are within the respective threshold.

3. The method of claim 1, wherein the material comprises plural substrate layers and further comprising developing a system of equations for the plural substrate layers as a function of the index of refraction coefficient and the extinction coefficient.

4. The method of claim 3, wherein the material comprises at least one coating on one of the plural substrate layers and wherein developing the system of equations comprises developing a system of equations for the at least one coating as a function of the index of refraction coefficient and the extinction coefficient.

5. The method of claim 3, further comprising solving the system of equations for the index of refraction coefficient with a fixed extinction coefficient value until the calculated value for the index of refraction coefficient is within the threshold.

6. The method of claim 5, further comprising, solving the system of equations for the extinction coefficient with a fixed index of refraction coefficient value until the calculated value for the extinction coefficient is within the threshold.

7. The method of claim 1, further comprising defining the threshold determined by the difference between the one or more measured values indicative of reflectance or transmittance and the predicted reflectance or transmittance using a convergent tolerance for a total percentage of reflected energy and transmitted energy, respectively.

8. The method of claim 1, wherein the material forms plural components of an aircraft window system, and determining the set of calculated values for an index of refraction coefficient and an extinction coefficient from the measured values indicative of reflectance and transmittance, respectively, comprises matrix solving for plural vector values at one or more interface surfaces of the plural components to determine a net radiation.

9. The method of claim 1, wherein identifying the calculated value from the set of calculated values for the index of refraction coefficient and the calculated value from the set of calculated values for the extinction coefficient that are within a threshold comprises iteratively selecting a value from the set of calculated values.

10. A system for determining optical properties for a plurality of window configurations for window systems in order to identify from one or more of a reflectance for a material, a transmittance for a material, or a percentage of one or more of reflected, transmitted, or absorbed energy for the material, an optimum window configuration for window systems that is selected to obtain validation by testing one identified window configuration instead of each of a plurality of window configurations for the window systems, wherein each of the window systems has a window outer pane and a window inner pane, the system comprising:
 a spectrophotometer configured to provide one or more measured values indicative of the reflectance and the transmittance of the material of the plurality of window configurations for the window systems;
 a storage subsystem configured to store the one or more measured values; and
 a processor operably coupled to the spectrophotometer and including software modules having instructions therein which when executed by the processor are configured to obtain the one or more measured values indicative of the reflectance and the transmittance, the processor configured to:
  determine a set of calculated values for an index of refraction coefficient and an extinction coefficient from the measured values indicative of the reflectance and the transmittance, respectively;
  identify a calculated value from the set of calculated values for the index of refraction coefficient and a calculated value from the set of calculated values for the extinction coefficient that are within a threshold determined by the difference between the one or more measured values indicative of the reflectance or the transmittance and a predicted reflectance or transmittance, respectively;
  determine the reflectance and the transmittance for the material using the calculated values identified within the threshold; and
  determine the percentage of the one or more of reflected, transmitted, or absorbed energy for the material of the plurality of window configurations for the window systems.

11. The system of claim 10, further comprising an aircraft window system, wherein plural components of the aircraft window system are formed from the material, wherein the processor is further configured to determine the set of calculated values for the index of refraction coefficient and the extinction coefficient from the measured values indicative of the reflectance and transmittance, respectively, by matrix solving for plural vector values at one or more interface surfaces of the plural components to determine a net radiation.

12. The system of claim 10, wherein the processor is further configured to iteratively change the calculated values for the index of refraction coefficient and the extinction coefficient until both values are within a respective threshold.

13. The system of claim 10, wherein the material comprises plural substrate layers and at least one coating on one of the plural substrate layers, the processor further configured to develop a system of equations for the plural substrate layers and the at least one coating as a function of the index of refraction coefficient and the extinction coefficient.

14. A tangible and non-transitory computer readable medium comprising one or more computer software modules including instructions therein configured to direct one or more processors to:
 acquire one or more measured values with a spectrophotometer indicative of a reflectance for a material of a plurality of window configurations for window systems, wherein each of the plurality of window system has a window outer pane and a window inner pane;
 acquire one or more measured values with a spectrophotometer indicative of a transmittance for the material;
 determine a set of calculated values for an index of refraction coefficient and an extinction coefficient from the measured values indicative of reflectance and transmittance, respectively;
 identify a calculated value from the set of calculated values for the index of refraction coefficient and a calculated value from the set of calculated values for the extinction coefficient that are within a threshold determined by the difference between the one or more measured values indicative of the reflectance or transmittance and a predicted reflectance or transmittance, respectively;
 determine a reflectance and transmittance for the material using the calculated values identified within the threshold; and
 determine a percentage of one or more of reflected, transmitted, or absorbed energy for the material of the plurality of window configurations for the window systems.

15. The tangible and non-transitory computer readable medium of claim 14, wherein the computer readable medium is further configured to direct the one or more processors to:
 iteratively change the calculated values for the index of refraction coefficient and the extinction coefficient until both values are within a respective threshold.

16. The tangible and non-transitory computer readable medium of claim 14, wherein the material comprises plural substrate layers, and the computer readable medium is further configured to direct the one or more processors to:
 develop a system of equations for the plural substrate layers as a function of the index of refraction coefficient and the extinction coefficient.

17. The tangible and non-transitory computer readable medium of claim 16, wherein the material comprises at least one coating on one of the plural substrate layers, and the computer readable medium is further configured to direct the one or more processors to, when developing the system of equations:
 develop a system of equations for the at least one coating as a function of the index of refraction coefficient and the extinction coefficient.

18. The tangible and non-transitory computer readable medium of claim 16, wherein the computer readable medium is further configured to direct the one or more processors to:
 solve the system of equations for the index of refraction coefficient with a fixed extinction coefficient value until the calculated value for the index of refraction coefficient is within the threshold and solve the system of equations for the extinction coefficient with a fixed index of refraction coefficient value until the calculated value for the extinction coefficient is within the threshold.

19. The tangible and non-transitory computer readable medium of claim 14, wherein the computer readable medium is further configured to direct the one or more processors to:
    define the threshold determined by the difference between the one or more measured values indicative of reflectance or transmittance and the predicted reflectance or transmittance using a convergent tolerance for a total percentage of reflected energy and transmitted energy, receptively.

20. The tangible and non-transitory computer readable medium of claim 14, wherein the material forms plural components of an aircraft window system, and the computer readable medium is further configured to direct the one or more processors to:
    determine the set of calculated values for the index of refraction coefficient and the extinction coefficient from the measured values indicative of reflectance and transmittance, respectively, by matrix solving for plural vector values at one or more interface surfaces of the plural components to determine a net radiation.

\* \* \* \* \*